(12) United States Patent
Vishal

(10) Patent No.: US 11,816,424 B2
(45) Date of Patent: Nov. 14, 2023

(54) CONDITIONAL SAVE OF DRAFT ENABLED BUSINESS OBJECTS

(71) Applicant: SAP SE, Walldorf (DE)

(72) Inventor: Vivek Vishal, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/509,618

(22) Filed: Oct. 25, 2021

(65) Prior Publication Data

US 2023/0128296 A1 Apr. 27, 2023

(51) Int. Cl.
*G06F 17/00* (2019.01)
*G06F 40/174* (2020.01)
*G06F 16/16* (2019.01)
*G06Q 10/105* (2023.01)

(52) U.S. Cl.
CPC .......... *G06F 40/174* (2020.01); *G06F 16/164* (2019.01); *G06Q 10/105* (2013.01)

(58) Field of Classification Search
None
See application file for complete search history.

(56) References Cited

U.S. PATENT DOCUMENTS

| | | | |
|---|---|---|---|
| 2016/0063026 A1* | 3/2016 | Mokhtarzada | G06F 16/122 707/617 |
| 2020/0067997 A1* | 2/2020 | Hardee | G06F 40/166 |

OTHER PUBLICATIONS

"Draft—SAP Help Portal," 5 pages, printed Aug. 10, 2021 from https://help.sap.com/viewer/923180ddb98240829d935862025004d6/Cloud/en-US/a81081f76c904b878443bcdaf7a4eb10.html/.
"Integrating Unmanaged Save in Managed Business Objects," 5 pages, printed Aug. 10, 2021 from https://help.sap.com/viewer/923180ddb98240829d935862025004d6/Cloud/en-US/2c2bec28fff6475f922f9f876491826d.html/.

* cited by examiner

*Primary Examiner* — Mustafa A Amin
(74) *Attorney, Agent, or Firm* — Sterne, Kessler, Goldstein & Fox P.L.L.C.

(57) ABSTRACT

Disclosed herein are system, method, and computer program product embodiments selectively saving draft attributes. In some embodiments, a server generates a form comprising data fields. The server defines associated with the form. The server detects an event associated with the form. Each of the of data fields includes a respective attribute. The server identifies one or more of data fields that are to be draft-enabled in response to the event based on a definition of the event. The server further identifies at least one data field of the plurality of data fields for which draft-enablement is to be removed. The server generates metadata for the at least one data field removing the draft-enablement and stores a draft of each respective attribute for each of the plurality of data fields, excluding an attribute for the at least one data field in a data storage device.

20 Claims, 9 Drawing Sheets

| Standard ∨ | Manage Service ▽ | | | | | | |
|---|---|---|---|---|---|---|---|
| | | | | | | Hide Filter Bar Filters [Go] | |
| Institution: | Validity: | Service ID: | Published: | Version ID: | Valid From: | Valid To: | |
| [ ] | [dd.MM.yyyy] [📅] | [ ] | [ ] | [ ] | [ ] | [ ] | |
| Billable: | | | | | | | |
| [ ∨ ] | | | | | | | |
| CGH | SER19 | 20210630 | ✏ In Process | | 30.06.2021 | 30.06.2021 | ⌄ |
| CGH | SER19 | 20210701 | ✏ In Process | | 01.07.2021 | 29.06.2021 | ⌄ |
| Service ID: SER19 | | | | | | | |
| CGH | SER19 | 20210801 | ⊘ Deployed | | 01.06.2021 | 14.06.2021 | ⌄ |
| CGH | SER19 | 20210831 | ✏ In Process | | 31.08.2021 | 29.09.2021 | ⌄ |
| CGH | SER19 | 20210615 | ✏ In Process | | 15.06.2021 | 30.07.2021 | ⌄ |
| Service ID: SER2 | | | | | | | |
| CGH | SER2 Draft | 20210430 | ✏ In Process | | 30.04.2021 | 31.05.2021 | ⌄ |
| CGH | SER2 Draft | 20210731 | ✏ In Process | | 31.07.2021 | 31.08.2021 | ⌄ |
| CGH | SER2 Draft | 20211101 | ✏ In Process | | 01.11.2021 | 29.11.2021 | ⌄ |
| CGH | SER2 | 20210901 | ⊘ Deployed | | 01.09.2021 | 29.09.2021 | ⌄ |
| CGH | SER2 | 20211001 | ⊘ Deployed | | 01.10.2021 | 30.10.2021 | ⌄ |
| Service ID: SER20 | | | | | | | |
| CGH | SER20 | 20210501 | ⊘ Deployed | | 01.05.2021 | 31.05.2021 | ⌄ |
| Service ID: SER3 | | | | | | | |
| CGH | SER3 | 20210430 | ⊘ Deployed | | 30.04.2021 | 31.05.2021 | ⌄ |
| Service ID: SER4 | | | | | | | |

Manage Service

Mass Test
SER100

Service Group: LAB
Service Sub-Group:

Status: In Process
Validity: 01.07.2021-31.07.2021

Remarks:

Edit Service | Edit Price | Copy Service | Delete

ISERV | Institution
CGH

500 ← (overall)
502 ← (Remarks box)

FIG. 5

CONDITIONAL SAVE OF DRAFT ENABLED BUSINESS OBJECTS

BACKGROUND

Applications often involve inputting data using forms. The forms may include numerous data fields across different sections relevant to the business need of the application. Each of the data fields across different sections may correspond with different entities in a data model. As such, inputting and saving the data may be a time-consuming and tedious process. Such applications implement a representational state transfer (REST) protocol to allow saving of data and also to prevent data loss (e.g., due to system or power failure). The REST protocol can be leveraged to enable a save draft function. The save draft function temporarily stores a state of the attributes for each of the data fields. The attributes may be temporarily stored in a buffer.

This feature helps a user to continue registering the input and save the input "temporarily" so that it can be accessible in a new session or a device and does not get lost if the form or the application is closed either knowingly or by accident. This improves productivity and avoids rework. Once the user is sure of the updates, they can use the SAVE button to finally save the temporary data into the database and flush the temporary record. The draft function can be enabled to save all the data of the form in a temporary record based on programming logic of the application.

However, temporarily saving the attributes for each data field may be an operationally expensive process. This often causes performance issues and is a heavy load on the network. Additionally, some data fields may not accept attributes that can be temporarily saved (e.g., files, attachment data, data from legacy systems or different platforms, unique data structures, etc.). Therefore, making these data fields draft-enabled may require additional programming and considerable effort. Also, because the data model has entities that are associated or connected to each other it was not possible to selectively draft enable sections or entities of the form. Furthermore, there could be legacy systems that may not support a save draft function. As a result, harmonizing or replicating the data to the main database of a given legacy system or multiple systems could be very expensive to implement and also affect the performance.

BRIEF DESCRIPTION OF THE DRAWINGS

The accompanying drawings are incorporated herein and form a part of the specification.

FIGS. 3-6 illustrate user interfaces of an application, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
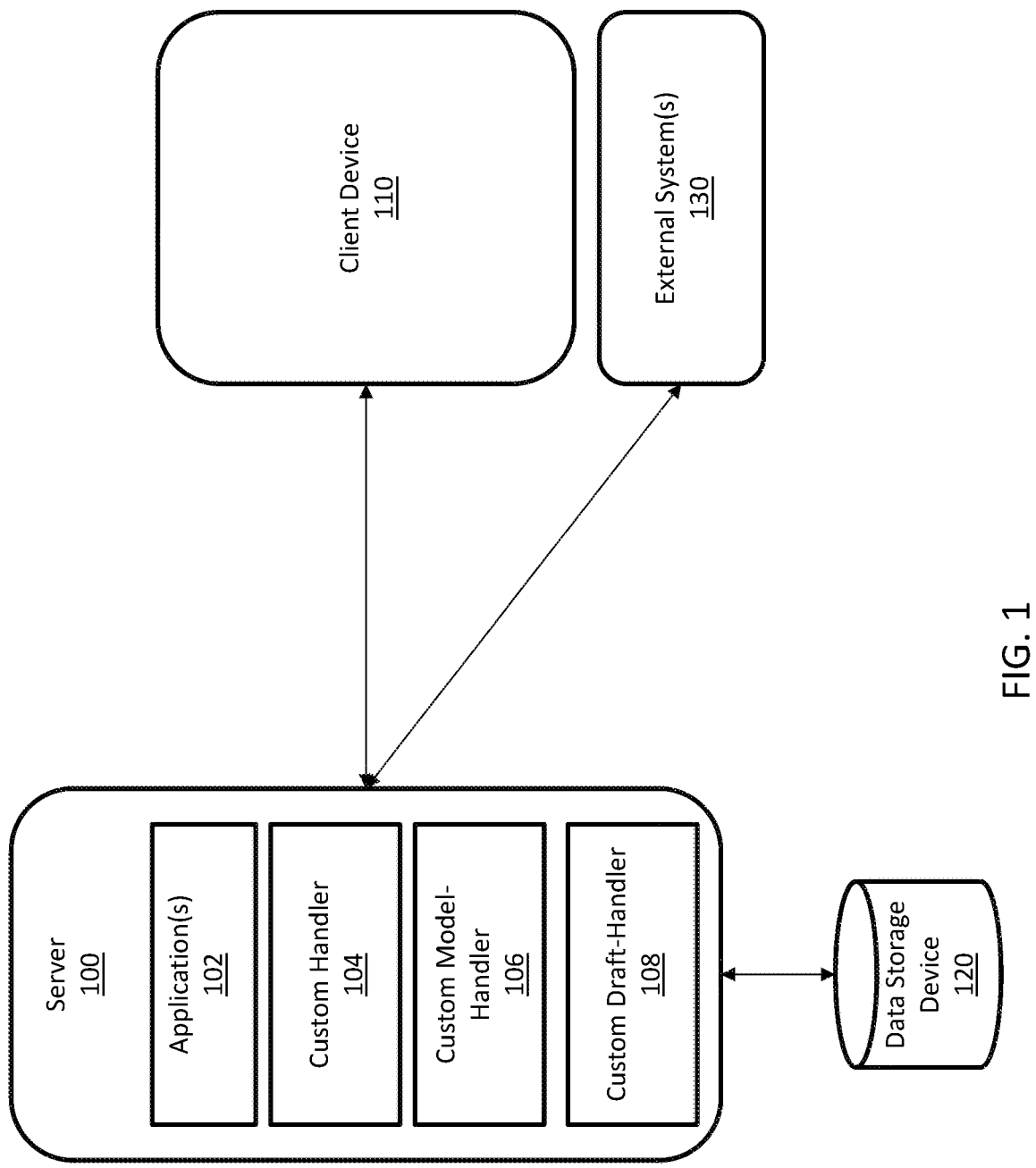
FIG. 1 is a block diagram of an architecture of a system for selectively saving draft attributes, according to some embodiments.

Provided herein are system, apparatus, device, method and/or computer program product embodiments, and/or combinations and sub-combinations thereof, for selectively saving draft attributes.

As described above, applications that implement REST protocol allow for a save draft function, which temporarily saves attributes for each data field of a form while the form is a work in progress. Specifically, each data field may correspond with an entity. Each entity may be associated or linked with multiple child entities. When a user is inputting an attribute or has completed inputting the attribute for a given data field of an entity, the REST protocol temporarily saves the attribute of the entity and all of the attributes of the child entities of the entity. This prevents inadvertent loss of data.

However, based on the requirements of the application, it may not be necessary to save the attributes for each entity temporarily. As such, saving the attributes for each the entities may be operationally expensive and may cause performance issues.

For example, consider the following entities:

TABLE 1

| Entity | Type of Entity | Association |
| --- | --- | --- |
| Sales Order | Primary/Root | |
| Sales Order Item | Child to Sales Order | 1:N |
| Products | Child to Sales Order Item | 1:N |
| Services | Child to Products | 1:N |
| Notes | Child to Sales Order | 1:N |
| Attachments | Child to Sales Order Item | 1:N |

Sales order may be a parent entity. Sales order item, products, services, notes, and attachments may be child entities. In conventional systems and/or ideal scenarios, if sales order is draft-enabled, each of the child entities may also be draft-enabled. However, business requirements may not require entities such as notes or attachments to be draft-enabled. As such, storing the draft of the notes and attachments may be operationally expensive.

Additionally, some data fields may not accept attributes that can be temporarily saved (e.g., files, attachment data, data from legacy systems or different platforms, unique data structures, etc.). Therefore, making these data fields draft-enabled to comply with conventional systems and framework restrictions may require additional programming. This can be a time-consuming and expensive process.

Furthermore, draft-enablement constrains the type of the design of user interfaces of applications that provide large forms. For example, draft-enablement forces developers to break down the user interface into smaller features or screens to manage the draft feature in a better way. However, this often results in a lack of visibility of other "non-critical entities" while saving the "draft relevant entities".

Embodiments described herein solve these problems by selectively enabling and storing draft attributes for specified entities and suppressing attempts to store attributes for other entities in the draft table. The selective enablement on the draft table for selective entities of the data model helps to create a metadata and provide this information to the local application data model. When the user triggers a change in the form, the user interface reads the metadata at runtime to determine which fields or sections of data needs to be captured in the temporary draft table. It then performs a server call with only selective data or entity which is draft enabled.

In some embodiments, a server generates a form comprising data fields. The server defines associated with the form. Each event corresponds to selectively draft-enabling a respective one or more data fields of the plurality of data fields. The server detects an event associated with the form. Each of the of data fields includes a respective attribute. The server identifies one or more of data fields that are to be draft-enabled in response to the event based on a definition of the event. The server further identifies at least one data field of the plurality of data fields for which draft-enablement is to be removed. The server generates metadata for the at least one data field removing the draft-enablement and stores a draft of each respective attribute for each of the plurality of data fields, excluding an attribute for the at least one data field in a data storage device.

The embodiments described herein increase the performance of a system by only saving attributes for entities required based on the business requirements of an application. Furthermore, legacy system applications may be selectively draft implemented based on the need and technical feasibility. This reduces implementation efforts and improves performance. Moreover, embodiments herein do not require dependencies or navigations as a criteria for temporarily storing the attributes for the particular child entities or separating the entities that do not enable temporary draft; therefore, complex data models could be implemented easily based on the application need and business problem. The embodiments described herein also allow user interfaces to be more business relevant and not restricted due to technology constraints.

FIG. 1 is a block diagram of an architecture of a system for selectively saving draft attributes, according to some embodiments. In an embodiment, the architecture may include server 100, client device 110, data storage device 120, and external system(s) 130. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Data storage device 120 may be configured to store attributes corresponding to entities of a data model. Each attribute may be data, including structured and unstructured data. For example, an attribute may be a data object. Data storage device 120 may be configured to store persistent or temporary data. In this regard, data storage device 120 may be configured to store draft attributes corresponding to entities in the data model. The draft attributes may be stored temporarily for a predetermined time period. A draft attribute may be data that is to be stored in data storage device 120 temporarily so that the data is not lost. For example, the draft attribute may be data that is input/uploaded on a user interface (e.g., by a user). In response to an occurrence of a predefined action, the data storage device 120 may be prompted to store the draft attribute temporarily. The event may be a predetermined amount of time passing, a user selecting a data field and registering an input corresponding to saving a draft copy (e.g., a "save draft" button on a user interface), tabbing from data field to a next, selecting a different data field, etc. The draft attribute may reside in the data storage device for the predetermined time period or if new data is input/uploaded in its place on the user interface.

Server 100 may include application(s) 102, a custom handler 104, custom model-handler 106, and a custom draft-handler 108. Application(s) 102 may be locally executed or web-based applications that facilitate data entry of one or more data fields. Each data field may correspond to an entity in a data model stored in data storage device 120.

Custom handler 104 may reside in a user interface component of an application 102. Custom handler 104 may prevent drafts of data fields from being saved based on the attributes input by a user on the user interface based on the metadata of the data fields. Custom handler 104 will be described further with respect to FIG. 2.

Custom model-handler 106 may reside in the service APIs. The service APIs may reside between the user interface of application 102 and data storage device 120. Custom model handler 106 stores information associated with a data model of application 102, entities corresponding to draft-enabled data fields, an association of source/parent entities and child/target entities, etc. Custom model-handler 106 may generate the metadata for the data fields indicating whether the data fields are draft-enabled. Custom model-handler 106 will be described further with respect to FIG. 2.

Custom draft-handler 108 may reside in the service APIs. Custom draft-handler 108 may be configured to invoke custom model-handler 106 to generate metadata for data fields indicating whether the data fields are draft-enabled. Custom-draft handler 108 may determine whether to invoke custom model-handler 106 based on predefined rules associated with application 102. Custom draft-handler 108 will be described further with respect to FIG. 2.

External system(s) 130 may be systems that execute legacy applications on different platforms. The legacy applications may facilitate data entry of one or more data fields. However, legacy applications may not allow for saving draft attributes due to older technology or system features. Furthermore, external system 130 may also not allow for selectively saving draft attributes. However, external system 130 may interface with server 100 to save draft attributes for one or more data fields on a user interface of a legacy application.

Figure 2:
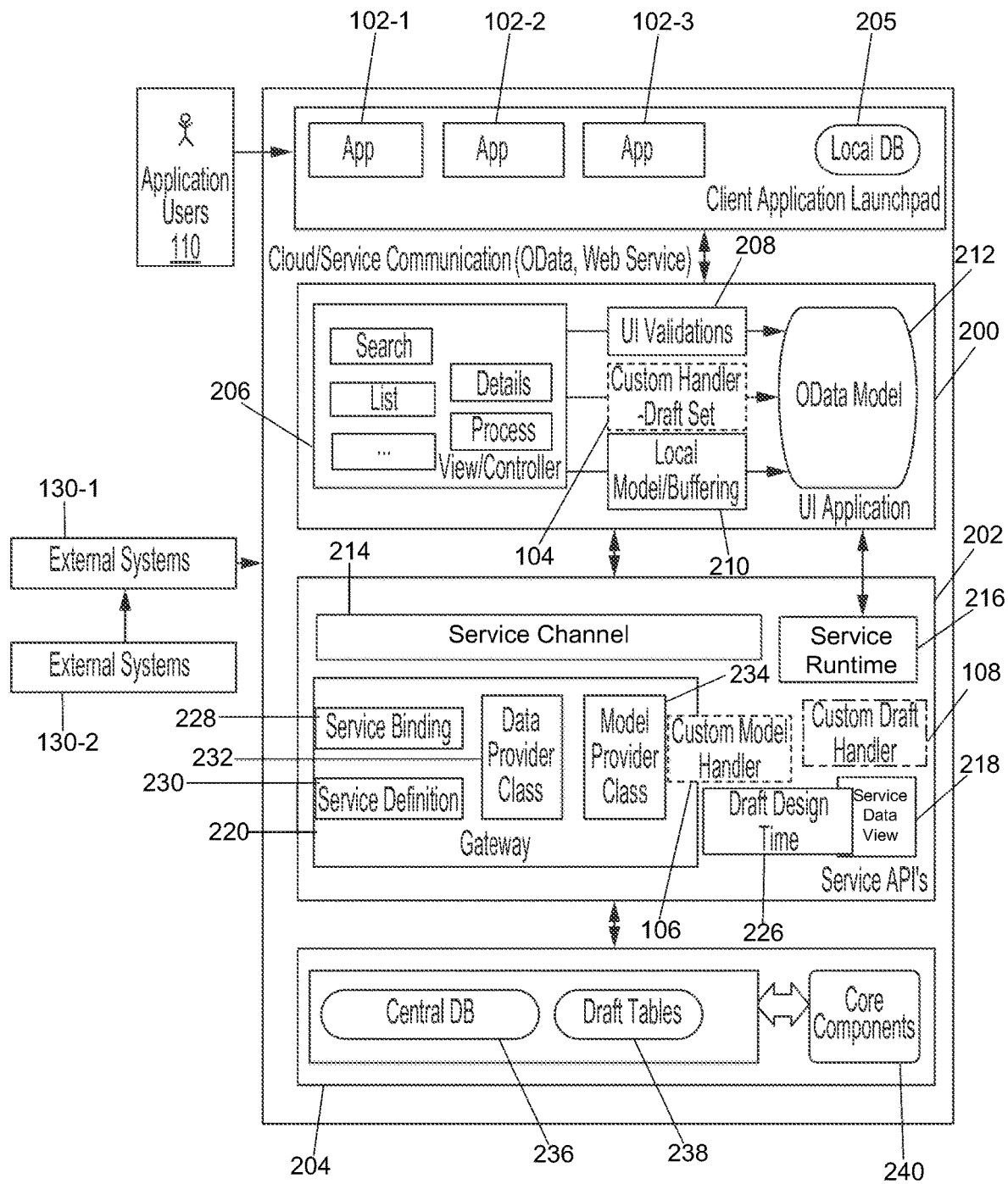
FIG. 2 is a block diagram illustrating the data flow in the system for selectively saving draft attributes, according to some embodiments.

FIG. 2 is a block diagram illustrating the data flow in the system for selectively saving draft attributes, according to some embodiments. FIG. 2 shall be described with reference to FIG. 1.

As described with respect to FIG. 1, the system for selectively saving draft attributes may include server 100, client device 110, data storage device 120, and external system(s) 130. For example, the system may include external system 130-1 and external system 130-1.

Server 100 may include application 102-1, application 102-2, and application 102-3. Server 100 may further include a user interface (UI) application 200, service Application Program Interfaces (APIs) 202, and data layer 204. UI application 200, service APIs 202, and data layer 24 may reside locally or in a cloud computing environment.

Applications 102-1, 102-2, and 102-3 may be executed on a browser or locally. Applications 102-1, 102-2, and 102-3 may include a local database (DB) 205. Local DB 205 may store a state of application 102-1, 102-2, or 102-3. Furthermore, local DB 205 may store a copy of the data model for application 102-1, 102-2, and 102-3.

UI application 200 may consume and communicate with the Service API's 202 through OData or Web services for applications 102-1, 102-2, or 102-3. Specifically, UI application 200 may include view controller 206, UI validation 208, custom handler—draft 104, local model/buffering 210, and OData model 212.

View controller 206 may control the user interface's output for applications 102-1, 102-2, and 102-3. The output may include search boxes, form data fields, lists, details, etc. UI validation 208 may be a service or a business logic configured to validate the input received on the user interface for applications 102-1, 102-2, or 102-3 based on predetermined rules. For example, UI validation 208 may validate date inputs and phone number inputs to be in the correct format accepted by application 102-1, 102-2, or 102-3. The predetermined rules may be based on the OData model 212. Custom handler-draft 104 may facilitate selectively saving draft attributes for data fields that correspond with draft-enabled entities based on the metadata of the data fields. Local model/buffering 210 may provide buffering services for data associated with the user interface of applications 102-1, 102-2, or 102-3. Specifically, local model/buffering 210 may determine how to store or update OData model 212.

OData model 212 may be an open data protocol data model. This allows it to be implemented with REST APIs. OData model 212 may store a local data model corresponding to application 102-1, 102-2, or 102-3. The data model may include the entities for application 102-1, 102-2, or 102-3, a mapping of data fields in the user interface of application 102-1, 102-2, or 102-3 to the respective entities, relationships of the entities, predetermined rules for data fields (e.g., accepted formats, required fields, etc.), etc. OData model 212 may be configured to capture the data input on the user interface of applications 102-1, 102-2, or 102-3.

Furthermore, service APIs 202 may include APIs that facilitate data storage from the user interface of application 102-1, 102-2, or 102-3 in data layer 204. Service APIs 202 may include service channel 214, service runtime 216, and service data views 218, which are built using Gateway 220. Gateway 220 may be a tool or a framework built on or to support the RESTful Programming Model 220 that support OData or Web services generation. Service APIs 202 may further include custom model-handler 106, custom draft-handler 108, and draft design time 226. The preferred tool or framework built on the RESTful programming model such as gateway 220 may create or generate service artefacts and objects such as service binding 228, service definition 230, data provider class 232, and model provider class 234.

Service channel 214 is a gateway that allows for RESTful/ OData services communication from the user interface of application 102-1, 102-2, or 102-3 during the runtime of the application 102-1, 102-2, or 102-3. As such, service channel 214 directs traffic received from UI application 200 to the appropriate API 202 for the corresponding core components 240.

Service runtime 216 may expose Service Data Views 218 as an OData service. Views 218 may be CDS views or any other data set of a business object. Service data views 218 may be views of a database table independent of the database. Particularly, service data views 218 may be virtual data models and allow direct access to data layer 204.

As indicated above, a RESTful programming model based tool or framework such as gateway 220 may include service binding 228. Service binding 228 may be a service definition to a client-server communication protocol such as OData. Gateway 220 may also include service definition 230. Service definition 230 may describe which entities of a data model that are exposed for a specific business object. Data provider class 232 is used to build the technical or business logic to expose the data for the various use cases of the Application 120 through an OData or RESTful service using the service channel 214. Data provider class 232 indicates how to provide data on the user interface. Model provider class 234 may be used to define the data model. This allows for creating entities and properties for the data model. As such, data provider class 232 and model provider class 234 are design time artefacts that build the data model and provide the necessary logic to enable the scenario specific business data through OData or RESTful service exposed via service channel 214.

Draft design time 226 is a framework that enables services using the created OData and RESTful service to record user interaction with applications 102-1, 102-2, or 102-3. Custom model-handler 106 may store a data model for application 102-1, 102-2, or 102-3, entities which are to be selectively draft-enabled, relationships between source/parent entities and child/target entities, an association index defining the relationship between source/parent entities and the child/target entities, etc.

Custom draft-handler 108 may be configured to invoke custom model-handler 106 based on a predefined series of occurrences or events being executed regarding application 102-1, 102-2, or 102-3. The occurrences or events may be captured by draft design time 226 (e.g., user interactions with applications 102-1, 102-2, or 102-3). There may be numerous different predefined series of occurrences.

Specifically, custom draft handler 108 may identify or detect a call from UI application 200 to save a draft of attributes corresponding to entities of a form of application 102-1, 102-2, or 102-3. This may be a service call received from UI application 200. Custom draft handler 108 may validate whether all of the attributes, parameters, etc., are correctly defined in the service call based on a data model of application 102-1, 102-2, or 102-3. As a result of this check, custom draft handler 108 may determine that draft call is not invoking a request to save the draft of all of the entities of application 102-1, 102-2, or 102-3, custom draft handler 108 may invoke custom model-handler 106 to determine which attributes, entities, or sections of the form for application 102-1, 102-2, or 102-3 are selectively draft-enabled.

Upon invoking custom model-handler 106, custom model-handler 106 may determine which attributes, entities, or sections are draft-enabled for the particular form based on the series of occurrences, use case or business scenario. The default setting may be that each data field corresponding to each entity of the form is draft-enabled. However, custom model-handler 106 may store business requirements that require draft-enablement of certain entities and do not require draft-enablement of other entities. The draft-enabled entities may be critical to application 102-1, 102-2, 102-3. The draft-enabled entities may be user-specified or business process specific. Custom model-handler 106 may generate metadata for data fields in a form for application 102-1, 102-2, or 102-3 that removes the draft-enabled for data fields corresponding to entities that are not to be draft-enabled.

Data layer 204 may include central database (DB) 236, draft tables 238, and core components 240. Central DB 236 and draft tables 238 may be included in data storage device 120. Central database DB 236 and draft tables 238 may store attributes for entities based on the relevant data model for application 102-1, 102-2, or 102-3. Central database DB 236 may store persistent data. Furthermore, draft tables 238 may temporarily store draft data (e.g., draft attributes). Draft tables 238 may include the same data tables for application 102-1, 102-2, or 102-3 as included in central DB 236. The data tables may include the entities. Draft tables 238 store the draft or temporary values of the attributes for the corresponding entities in the data tables for a predetermined time period. As such, draft tables 238 may delete the draft attributes after the predetermined time period. This may happen when the user decides to save the changes from the application to the actual database.

As a non-limiting example, a user, using client device 110, may generate a form including data fields. Each data field may correspond to an entity of application 102-1. The user may define events for the form which indicate scenarios in which one or more of the data fields are selectively draft-enabled. Custom model-handler 106 may store the events.

Application 102-1 may provide a user interface for filling out a form for a job candidate. The user interface may include the form. The user interface may be displayed on client device 110. The data fields for the form are shown in Table 1.

TABLE 2

| Candidate Information (Source Entity) |
| Contact Information (Source Entity) |
| Employment Information (Source Entity) |

Table 1 includes data fields for candidate information, contact information, and employment information. Candidate information, contact information, and employment information may correspond with entities in the data model for application 102-1. An entity may have a predefined relationship with other entities. For example, an entity may have one or more child entities that correspond with one or more data fields on the form. The relationships between the entities may be defined in an association index. To this end, Candidate Information may correspond to a source or parent entity of the data model for application 102-1. Candidate information may have two child entities, contact information, and employment information. The relationship of candidate information with contact information and employment information may be stored in an association index of application 102-21 or 102-2. The association index may include the following defining the parent-child relationship of Candidate Information with Contact Information and Employment Information: CandidateInfo: ContactDetail as 1:n and CandidateInfo: EmploymentDetail as 1:n.

A user may begin filling out the form on the user interface, as shown in Table 2.

TABLE 3

| Candidate Information (Source Entity) | John Smith | User identifier |
| Contact Information (Child Entity) | Mobile information | |
| Employment Information (Child Entity) | Company 1 | |

The user may input the following attributes in the data fields corresponding to the candidate information: "John Smith" and "User identifier". Furthermore, the user may input the following attribute in a data field corresponding to the Contact Information: "mobile information." Furthermore, the user may input the following attribute in a data field corresponding to the Employment Information: "Company 1."

Custom draft-handler 106 may detect an event from the events defined by the user. Furthermore, custom draft-handler 106 may receive a service call (e.g., draft call) to save a draft of the attributes of the one or more data fields from UI application 200. Custom draft-handler 106 may determine that custom model-handler 104 is to be invoked based on the metadata of the draft call that is triggered from UI application 200 to check which data fields, sections or entity is selectively draft enabled. Custom model-handler 106 may store the data model for application 102-1, the entities (source and child) that are draft-enabled, the association index, an indication of whether the entity is a source or child entity, etc. Upon being invoked, custom model-handler 104 may determine that Candidate Information is to be draft-enabled, Employment Information is to be draft-enabled; however, Contact Information is not to be draft-enabled based on one or more data fields that are draft-enabled based on defined event. The default setting for the data fields may be draft-enabled. Specifically, the metadata for each of the data fields may indicate that the respective data field is draft-enabled. Custom model-handler 104 may generate metadata at the design time upon activation of objects or data fields associated with Contact Information that removes draft-enablement of the corresponding data fields.

UI application 200 may determine that a predefined action has been executed. OData model 212 may capture the data input on the form on the user interface of application 102-1. Custom handler 104 may determine whether the data fields corresponding to Candidate Information, Contact Information, and Employment Information are draft-enabled based on the metadata of the data fields. For example, the metadata of the data fields of Candidate Information and Employment Information may indicate that the data fields are draft-enabled. However, the metadata for the data fields for Contact Information may indicate that they are not draft-enabled. As a result, custom handler 104 may instruct OData model 212 to save the drafts of attributes in the data fields corresponding to the Candidate Information, "John Smith" and "User identifier." Furthermore, custom handler 104 may instruct OData model 212 to save the drafts of the attribute in a data field corresponding to the Employment Information, "Company 1." Moreover, custom handler 104 may instruct OData model 212 not to save the draft of the attribute in the data field corresponding to the Contact Information, "mobile information."

OData model 212 may consume the details of the service APIs 202. Service APIs 202 may forward the request to data layer 204.

Data layer 204 may receive the request to store the draft attributes for the respective entities in draft tables 238. Draft tables 238 may store the draft attributes for the corresponding entities in the respective data tables based on the request. For example, draft tables 238 may store draft attributes "John Smith" and "User identifier" in a data table corresponding to the Candidate Information. Furthermore, draft tables 238 may store draft attributes "Company 1" in a data table corresponding to Employment Information.

In the event the form for application 102-1 has to be restarted, the data fields for Candidate Information and Employment Information will be repopulated with what is saved in draft tables 238. The data fields for Contact Information may not be repopulated with attributes.

In some embodiments, external systems 130-1 and 130-2 may implement legacy applications. The legacy applications may provide forms for data entry. However, these legacy applications may not allow for automatic draft enablement.

As such, custom draft-handler 108 may monitor a user's interaction with the legacy applications. Based on the occurrence of a certain scenario or a series of events with a legacy application, custom draft-handler 108 may invoke custom model-handler 104. Custom model-handler 104 may determine which entities are to be draft-enabled for the legacy application. Custom model-handler 104 may generate metadata for the data fields corresponding to entities that are to be draft-enabled for the legacy application. This allows for legacy applications that did not support draft-enablement to save selectively the draft attributes for the desired entities.

FIGS. 3-6 illustrate user interfaces of an application, according to some embodiments. FIGS. 3-6 may be described with respect to FIGS. 1-2. However, FIGS. 3-6 are not limited to this embodiment.

With respect to FIG. 3, user interface 300 is illustrated. User interface 300 may be provided by application 102, and application 102 may allow for searching for services which is a sample business scenario but not limited. User interface 300 may include sample search fields such as institution, validity, service ID, published, version ID, valid from, valid to, and billable. A user may provide input in any one of these fields to generate search results 302.

Search results 302 may include primary keys such as Service ID to uniquely identify a service. These services can be grouped with any attribute of the Service Master object, example: Service ID and there could be different versions of Service ID which can be uniquely identified by any attribute of the Service Master data object. Versions of the service are displayed under Service ID. The versions may be maintained for reasons such as change of date or change of deployment status. In this example, the association index stored in custom model-handler 106 for application 102 may indicate that the service is a source entity and the respective versions are the child entities.

Figure 4:
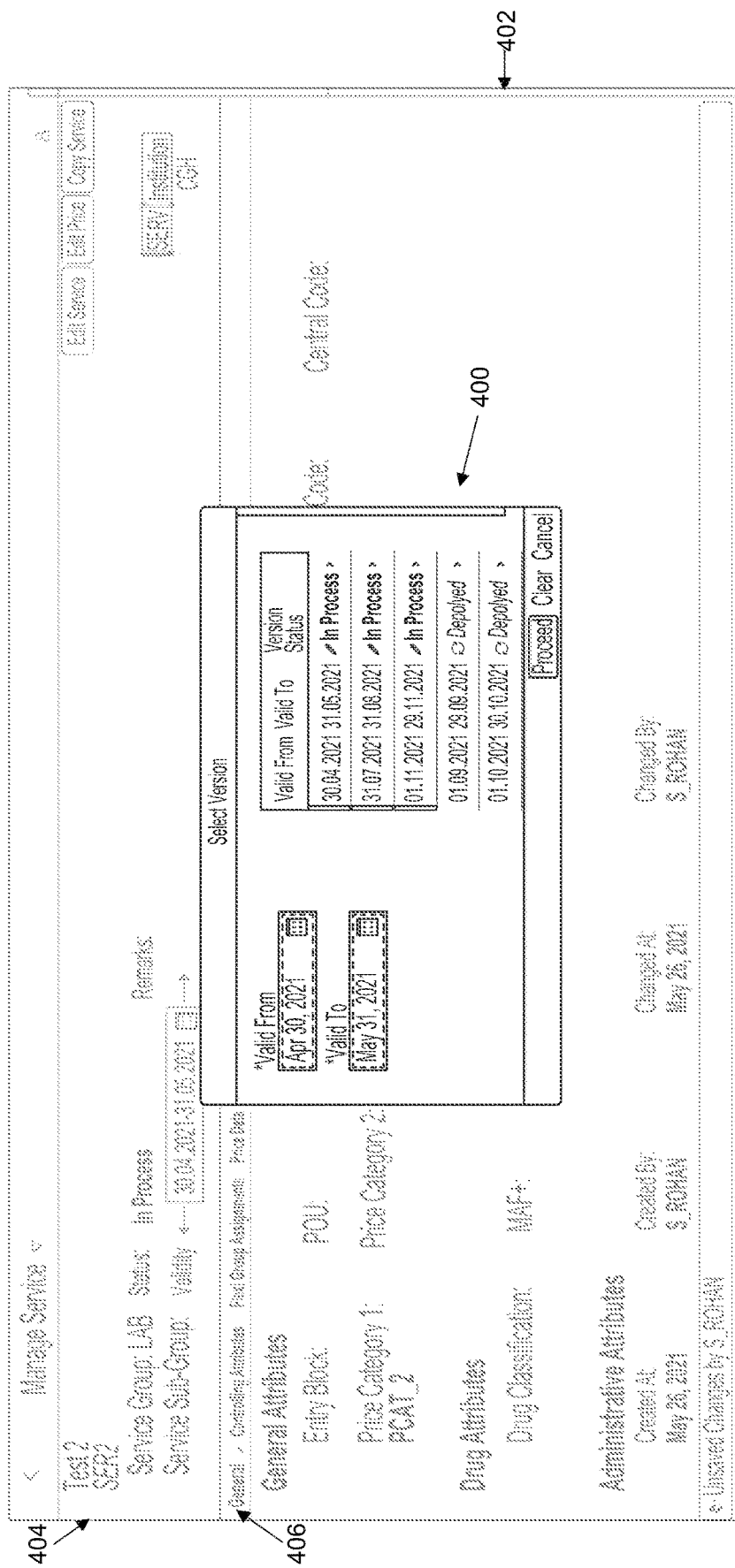

With respect to FIG. 4, user interface 400 is illustrated. User interface 400 is displayed over background screen 402. Background screen 402 is a user interface displayed in response to a user selecting one of the versions of a service listed under search results 302. Background screen 402 may include data fields associated with the particular service corresponding to the selected version. Furthermore, background screen 402 may be details associated with a selected service. Background screen 402 may include source/parent entities 404 and child entities 406.

Background screen 402 may also provide an edit service button. The edit service button allows a user to edit a version of the service. In response to selecting edit service on the background screen 402, user interface 400 may be displayed over background screen 402.

User interface 400 allows searching for versions of a service for editing. For example, user interface 400 may allow a user to search for versions within a date range to be edited. User interface 400 may include data fields Valid From and Valid To. These data fields may be dates for searching for a version. This allows application 102 to determine whether the user intends to edit an existing version or a new version. In this scenario, custom model-handler 106 may have determined that the Valid From is draft-enabled. However, Valid To is not draft-enabled. This is because the Valid From date is necessary to search for the versions of the service. If a user searches a date range for which the Valid From date corresponds with one or more versions, the versions may be populated on user interface 400.

Alternatively, if the user searches a date range for which the Valid From date does not correspond with a version, application 102 may automatically generate a new version of the service. The new version of the service may include the default data fields of the service with the same association and selectively draft enabled entity or data fields that was implemented using the custom draft handler. Creating a new version would trigger a new service to be created.

Custom draft-handler 108 may identify this scenario that a new version and new service has been created based on the Valid From date not corresponding with an existing version of a service. In this scenario, as there may be numerous new data fields for the new version and new service, a user may not want each of the data fields to be draft-enabled. As such, custom draft-handler 108 may be configured to invoke custom model-handler 106.

In this scenario, the version and service have a cyclic relationship. That is, the version may be both the source or child entity to a service object, and the service may be both the source or child entity to a version, given the complexity of the business scenario. For example, as indicated with respect to FIG. 3, an association index may indicate that the service is a source entity and the versions are the child entity.

Custom model-handler 106 may determine which data fields are to be draft-enabled when a new service is created based on a new version being created (e.g., based on the current scenario). Custom model-handler 106 may generate metadata removing the draft-enablement for data fields that are not to be draft-enabled. Custom handler 104 may suppress or prevent an attempt to store draft attributes for data fields in the version or service entities that are not draft-enabled.

For example, with respect to FIG. 5, a header 500 of the service entity may include a data field for remarks. The metadata for the data field for remarks 502 may indicate that it is not draft-enabled. As such, custom handler 104 may instruct OData model 212 not to save the value of the attribute as a draft in the draft table for remarks 502.

Figure 6:
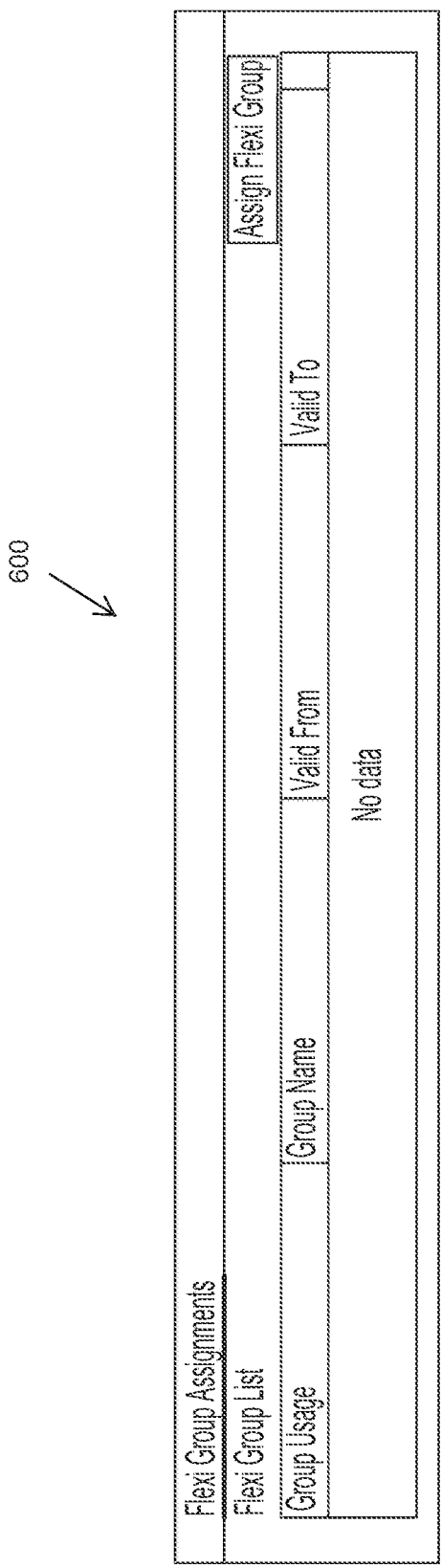

Furthermore, with respect to FIG. 6, the version entity may include a data field for flexi group assignments 600, which may not be draft-enabled. This may be because uploading flexi group assignments may require a unique data structure. This may be operationally expensive with communications and validations from multiple systems and legacy applications or may not also be business relevant. As such, application 102 may not require storing the draft attributes of the flex group assignments. The metadata for the data field for flexi group assignments 600 may indicate that it is not draft-enabled. As such, custom handler 104 may instruct OData model 212 not to save the value of the attribute or the entity as a draft in the draft table for flexi group assignments 600.

Figure 7:
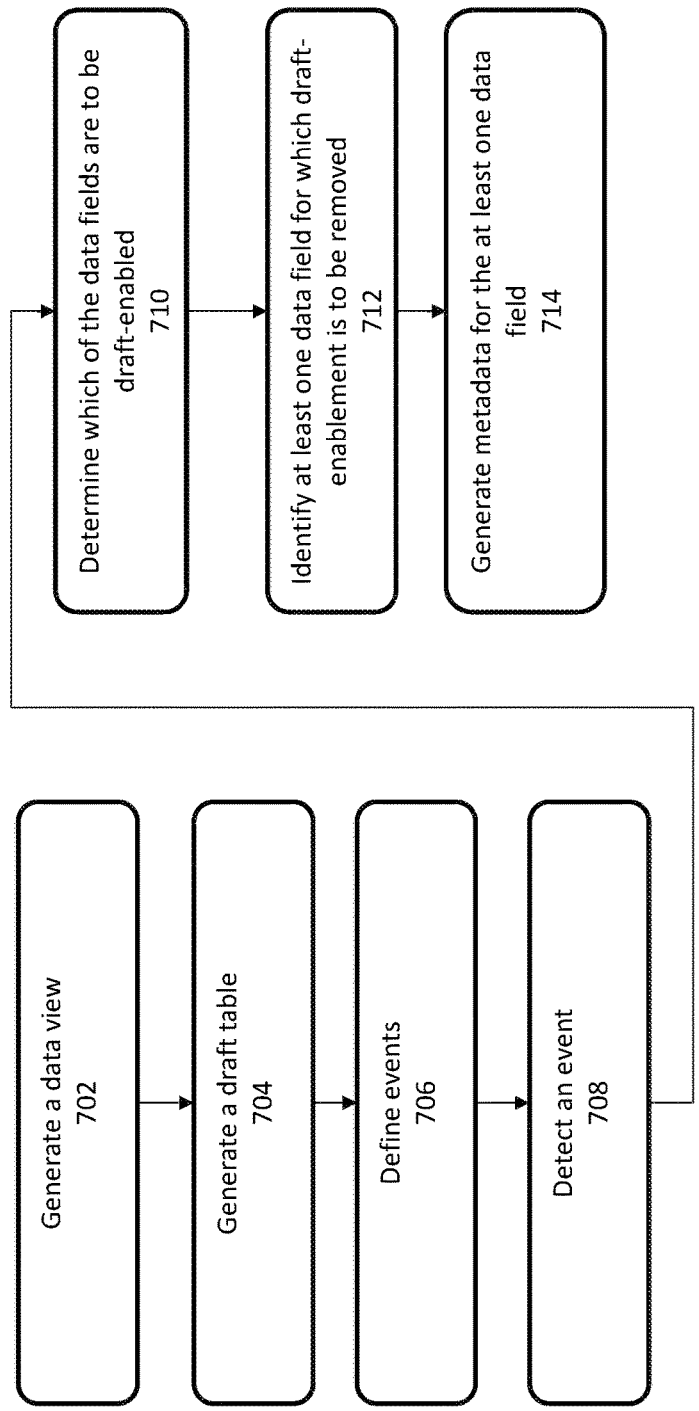
FIG. 7 is a flowchart illustrating a process for generating metadata, according to some embodiments.

FIG. 7 is a flowchart illustrating a process for generating metadata, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 7, as will be understood by a person of ordinary skill in the art.

Method 700 shall be described with reference to FIGS. 1-2. However, method 700 is not limited to that example embodiment.

In 702, server 100 generates a data view. The data view may include one or more entities. The entities correspond to data fields of a form. The form may be generated based on a user request received from client device 110. Each data field may correspond with an entity of application 102. The form may be provided on a user interface of application 102.

In 704, server 100 generates a draft table corresponding to the draft view in draft tables 238. The draft table may include the entities included in the draft view. Furthermore, the draft table may be configured to store draft attributes corresponding to the entities.

In 706, server 100 defines events associated with the form. Each event corresponds to selectively draft-enabling one or more data fields on the form, while the remaining data fields are not to be draft-enabled. The events may be a series of occurrences based on activation of the business objects (e.g., entities) associated with application 102 which has been modelled and implemented using the data provider class 232 and the model provider class 234. Custom model-handler 106 and custom draft handler 108 may store the events. As such, the draft-enablement may remain consistent for any user that accesses the form using application 102.

In 708, server 100 detects an event from the defined events. Custom model handler 106 may detect the event based on actions executed on the form.

In 710, server 100 determines which of the plurality of data fields that are to be draft-enabled in response to the event. Specifically, based on the event, custom draft-handler 108 may invoke custom model-handler 106. Custom model-handler 106 may determine which of the data fields are to be draft-enabled based on the business requirements of application 102 (e.g., based on the defined events).

In 712, server 100 identifies at least one data field for which draft-enablement is to be removed. The default setting may be draft-enable for each of the plurality of data fields. However, custom model-handler 106 may determine that the at least one data field should not be draft-enabled based on the business requirements. For example, the business requirements may indicate that the at least one data field is not critical, involves storing large amounts of data, updating or creating the field is an expensive operation or is not capable of being draft-enabled. As such, based on the business requirements, custom model-handler 106 may determine that the at least data field should not be draft-enabled.

In 714, server 100 generates metadata for the at least one data field, removing the draft enablement. Server 100 may also generate metadata for all the data fields that indicates the draft-enablement or disablement of the respective data field (e.g., the business object with entities, properties, associations, draft-enablement, draft enablement properties). Each of the data fields may be available in the metadata. The metadata may indicate whether the data field is draft-enabled. As indicated above, the default setting may be that metadata for each of the data fields may indicate that the data field is draft-enabled. By re-generating metadata for the at least one data field, custom model-handler 106 removes the draft-enablement for the at least one data field.

Figure 8:
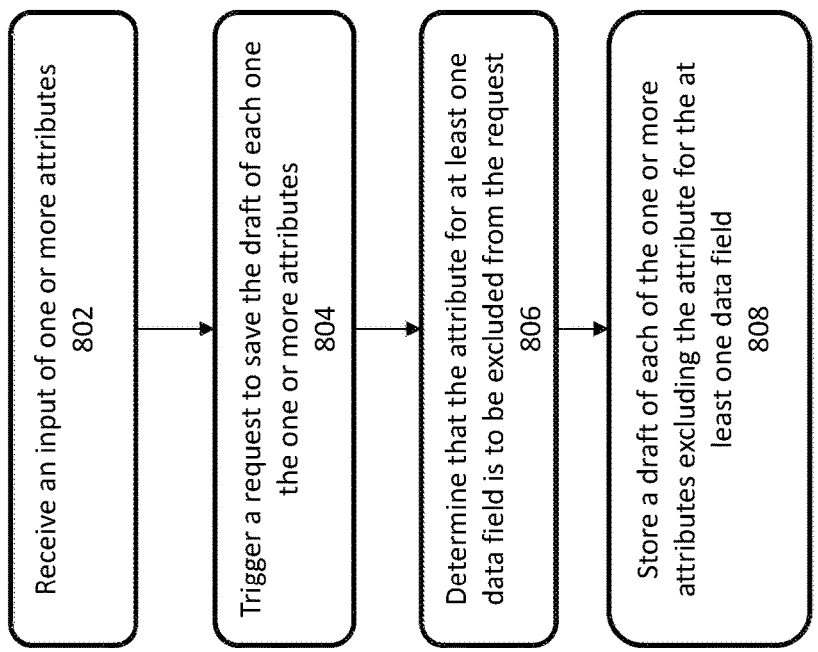
FIG. 8 is a flowchart illustrating the process of generating triggers, according to some embodiments.

FIG. 8 is a flowchart illustrating the process of selectively saving draft attributes, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 8, as will be understood by a person of ordinary skill in the art.

Method 800 shall be described with reference to FIGS. 1-2. However, method 800 is not limited to that example embodiment.

In 802, server 100 receives an input of one or more attributes for one or more data fields of a plurality of data fields. The data fields may be included in a user interface for application 102. The user interface may include a form. As such, the data fields may be form fields. The user interface may be displayed on client device 110. A user may provide the input of the one or more attributes using client device 110.

In 804, server 100 triggers a request to save the draft version for the list of data field(s) or entities from the form. The request may be triggered based on a list of business processes or validations or a predefined action. For example, as indicated above, the one or more data fields may be form fields. The request may be triggered each time a user tabs from one form field to another form field. In other words, the request may triggered in response to selecting a different form field. That way, the attributes that have been input in the respective form fields may be stored.

In 806, server 100 determines that the attribute for at least one data field is to be excluded from the request based on the metadata of the at least one data field. The metadata for the at least one data field may have been generated as described in method 700 in FIG. 7. Custom handler 104 may determine that the metadata for the at least one data field indicates that it is not draft-enabled by reading the metadata of the at least one data field in the shell of application 102.

In 808, server 100 stores a draft of each of the one or more attributes of the one or more data fields, excluding the attribute for the at least one data field in a data storage device. As such, an attempt to save the draft of the at least one data field is prevented or suppressed. The one or more attributes of the other data fields may be stored in draft tables 238. Draft tables 238 may include the data model of application 102. Specifically, draft tables 238 may include the data tables and respective entities corresponding to application 102. Draft tables 238 may store the one or more attributes of the other data fields for a predetermined amount of time.

Figure 9:
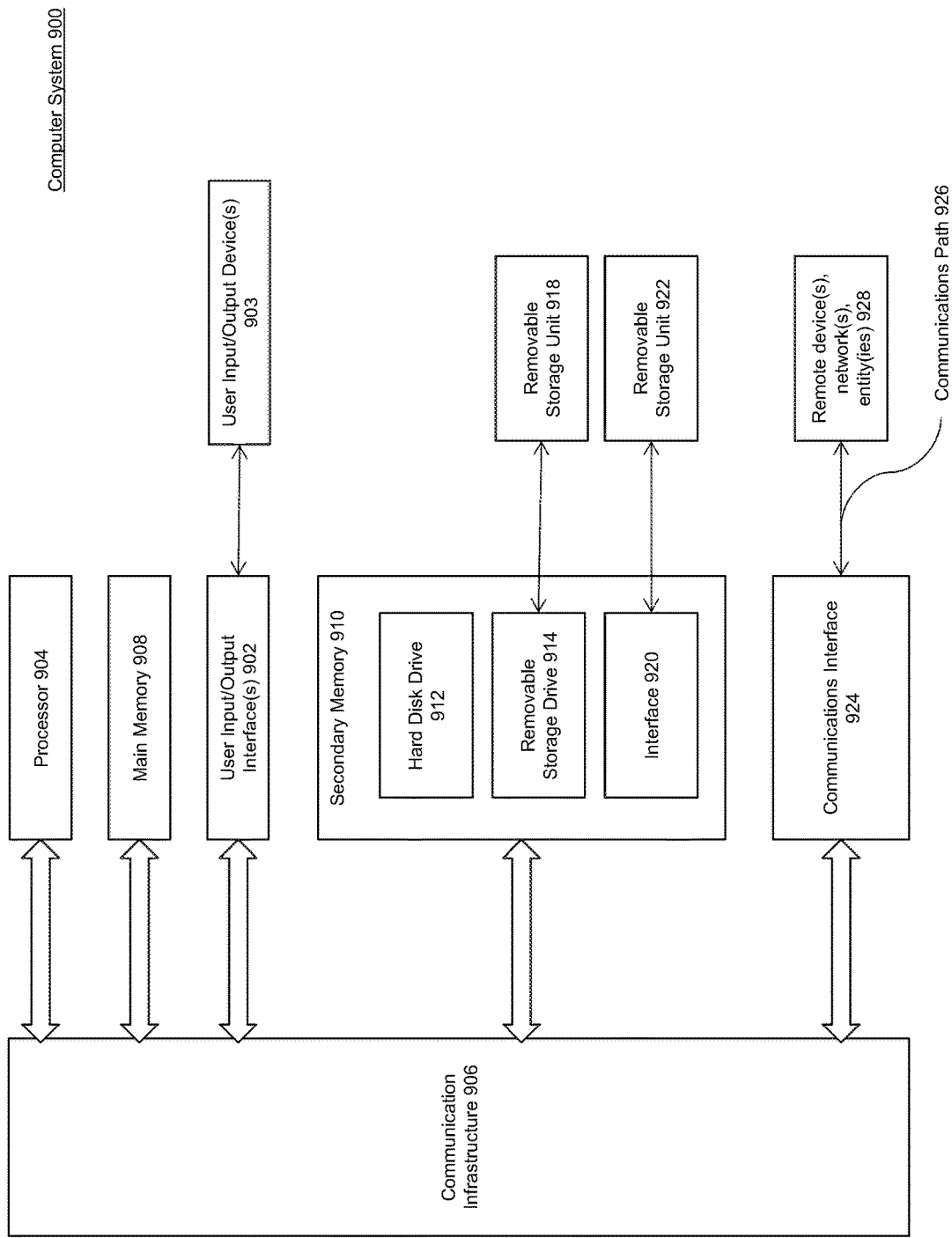
FIG. 9 is an example computer system useful for implementing various embodiments.

Various embodiments can be implemented, for example, using one or more computer systems, such as computer system 900 shown in FIG. 9. Computer system 900 can be used, for example, to implement methods 700 of FIG. 7 and method 800 of FIG. 8. Furthermore, computer system 900 can be at least part of server 100, client device 110, data storage device 120, and external system 130, as shown in FIG. 1. For example, computer system 900 route communication to various applications. Computer system 900 can be any computer capable of performing the functions described herein. Computer system 900 may be implemented locally on one or more servers, or as part of a cloud computing environment.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 can include one or more levels of cache. Main memory 908 has stored therein control logic (i.e., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer usable or readable storage device having stored thereon computer software (control logic) and/or data. Removable storage unit 918 can be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 can include other means, instrumentalities, or other approaches for allowing computer programs and/or other instructions and/or data to be accessed by computer system 900. Such means, instrumentalities, or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924. Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, etc. Control logic and/or data can be transmitted to and from computer system 900 via communication path 926.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:
1. A method for storing draft objects, the method comprising:
    generating, by a processor, a form comprising a plurality of data fields;

determining, by the processor, that the plurality of data fields are draft-enabled wherein in response to an update to a value of a respective one of the plurality of draft-enabled data fields in a user interface, the update is saved as a temporary record in a temporary draft table for a predetermined period of time after which the temporary record is deleted, wherein each of the plurality of data fields includes a respective attribute indicating whether the data field is draft-enabled;

detecting, by the processor, an event of a plurality of events associated with the form, wherein one or more data fields of the plurality of data fields that are draft-enabled are to be written to a storage device for temporary storage responsive to a detection of the event for the predetermined period of time;

identifying, by the processor, a first data field of the one or more data fields for which draft-enablement is to be removed;

generating, by the processor, metadata for the first data field removing the draft-enablement; and storing, by the processor, a draft of each respective attribute for each of the one or more data fields, excluding an attribute for the first data field in the storage device.

2. The method of claim 1, further comprising:
receiving, by the processor, input of each respective attribute for each of the plurality of data fields;
triggering, by the processor, a request to save the draft of each respective attribute for each of the plurality of data fields; and
determining, by the processor, that the attribute for the first data field is to be excluded from the request based on the metadata of the first data field.

3. The method of claim 2, wherein triggering the request is based on a predefined action.

4. The method of claim 1, wherein the draft of each respective attribute for each of the plurality of data fields, excluding the attribute for the first data field, is stored in the storage device for a predetermined amount of time.

5. The method of claim 1, wherein the storage device includes a plurality of entities, and each of the plurality of data fields corresponds with at least one entity of the plurality of entities.

6. The method of claim 5, further comprising storing, by the processor, an association index defining a relationship between the plurality of entities, wherein the relationship may be a parent-child relationship.

7. The method of claim 1, wherein the storage device stores a data model corresponding to an application associated with the form.

8. The method of claim 1, further comprising:
determining one of an expiration of the predetermined period of time or a save command; and
removing the stored draft of each respective attribute responsive to the determination of the expiration or the save command.

9. The method of claim 1, further comprising: detecting a save request initiated through the user interface prior to an expiration of the predetermined period of time; and deleting the temporary record responsive to detecting the save request.

10. A system for storing draft objects, the system comprising:
a memory; and a processor coupled to the memory, wherein the processor is configured to:
generate a form comprising a plurality of data fields;
determine that the plurality of data fields are draft-enabled wherein when an update is made to a value of a respective one of the plurality of draft-enabled data fields in a user interface, the update is saved as a temporary record in a temporary draft table for a predetermined period of time after which the temporary record is deleted, wherein each of the plurality of data fields includes a respective attribute indicating whether the data field is draft-enabled;

detect an event of a plurality of events associated with the form, wherein one or more data fields of the plurality of data fields that are draft-enabled are to be written to a storage device for temporary storage responsive to a detection of the event for the predetermined period of time;

identify a first data field of the one or more data fields for which draft-enablement is to be removed;

generate metadata for the first data field removing the draft-enablement; and store a draft of each respective attribute for each of the one or more data fields, excluding an attribute for the first data field in the storage device.

11. The system of claim 10, wherein the processor is further configured to:
receive input of each respective attribute for each of the plurality of data fields;
trigger a request to save the draft of each respective attribute for each of the plurality of data fields; and
determine that the attribute for the first data field is to be excluded from the request based on the metadata of the first data field.

12. The system of claim 11, wherein triggering the request is based on a predefined action.

13. The system of claim 10, wherein the draft of each respective attribute for each of the plurality of data fields, excluding the attribute for the first data field, is stored in the storage device for a predetermined amount of time.

14. The system of claim 10, wherein the storage device includes a plurality of entities, and each of the plurality of data fields corresponds with at least one entity of the plurality of entities.

15. The system of claim 14, wherein the processor is configured to store an association index defining a relationship between the plurality of entities, wherein the relationship may be a parent-child relationship.

16. A non-transitory computer-readable medium having instructions stored thereon that, when executed by at least one computing device, cause the at least one computing device to perform operations, the operations comprising:
generating a form comprising a plurality of data fields;
determining that the plurality of data fields are draft-enabled wherein when an update is made to a value of a respective one of the plurality of draft-enabled data fields in a user interface, the update is saved as a temporary record in a temporary draft table for a predetermined period of time after which the temporary record is deleted, wherein each of the plurality of data fields includes a respective attribute indicating whether the data field is draft-enabled;

detecting an event of a plurality of events associated with the form, wherein one or more data fields of the plurality of data fields that are draft-enabled are to be written to a storage device for temporary storage responsive to a detection of the event for the predetermined period of time;

identifying a first data field of the one or more data fields for which draft-enablement is to be removed;

generating metadata for the first data field removing the draft-enablement; and storing a draft of each respective attribute for each of the one or more data fields, excluding an attribute for the first data field in the storage device.

17. The non-transitory computer-readable medium of claim 16, wherein the operations further comprise:

receiving input of each respective attribute for each of the plurality of data fields;

triggering a request to save the draft of each respective attribute for each of the plurality of data fields; and determining that the attribute for the first data field is to be excluded from the request based on the metadata of the first data field.

18. The non-transitory computer-readable medium of claim 17, wherein triggering the request is based on a predefined action.

19. The non-transitory computer-readable medium of claim 16, wherein the draft of each respective attribute for each of the plurality of data fields, excluding the attribute for the first data field, is stored in the storage device for a predetermined amount of time.

20. The non-transitory computer-readable medium of claim 17, wherein the storage device includes a plurality of entities, and each of the plurality of data fields corresponds with at least one entity of the plurality of entities.

* * * * *